(12) United States Patent
Pittella

(10) Patent No.: US 10,669,770 B1
(45) Date of Patent: Jun. 2, 2020

(54) GLASS PANEL SHOE AND GLASS PANEL RAIL FRAME

(71) Applicant: Joseph A. Pittella, St. James, NY (US)

(72) Inventor: Joseph A. Pittella, St. James, NY (US)

(*) Notice: Subject to any disclaimer, the term of this patent is extended or adjusted under 35 U.S.C. 154(b) by 0 days.

(21) Appl. No.: 16/369,840

(22) Filed: Mar. 29, 2019

(51) Int. Cl.
*F16B 2/14* (2006.01)
*F16B 2/12* (2006.01)
*E06B 3/06* (2006.01)
*F16B 2/06* (2006.01)
*E04F 11/18* (2006.01)

(52) U.S. Cl.
CPC ............... *E06B 3/06* (2013.01); *F16B 2/14* (2013.01); *E04F 11/1834* (2013.01); *F16B 2/065* (2013.01)

(58) Field of Classification Search
CPC .... F16B 9/023; F16B 2/14; F16B 2/12; F16B 2/065; F16M 13/02; E04C 2/12; E04F 11/1853; E04F 11/1812; E04F 11/1851; E04F 11/1834; E04F 11/1823
See application file for complete search history.

(56) References Cited

U.S. PATENT DOCUMENTS

| | | | | |
|---|---|---|---|---|
| 2,169,713 A * | 8/1939 | Stroud | ............... | E06B 3/64 52/204.595 |
| 2,633,946 A * | 4/1953 | Huizenga | ............... | E06B 3/72 52/784.16 |
| 3,630,490 A * | 12/1971 | Horgan, Jr. | ......... | E04F 11/1851 256/24 |
| 4,054,268 A | 10/1977 | Sher | | |
| 4,680,903 A | 7/1987 | Horgan, Jr. | | |
| 4,837,993 A * | 6/1989 | Studenski | ............... | E06B 3/02 52/208 |
| 4,914,888 A * | 4/1990 | Hanson | ............... | E06B 3/02 52/656.5 |
| 5,069,010 A | 12/1991 | Trainor, Jr. et al. | | |
| 6,434,905 B1 | 8/2002 | Sprague | | |
| 7,559,536 B1 | 7/2009 | Hansen et al. | | |
| 7,584,588 B2 * | 9/2009 | Kim | ............... | E06B 3/5864 52/204.597 |
| 8,500,110 B2 * | 8/2013 | Allen | ............... | E04F 11/1851 269/297 |
| 9,127,474 B2 * | 9/2015 | Tinwala | ............... | E04H 17/16 |
| 9,169,640 B2 * | 10/2015 | Jeffers | ............... | E04B 2/7422 |
| 9,366,382 B2 * | 6/2016 | Bonomi | ............... | E04F 11/1853 |
| 9,777,484 B2 * | 10/2017 | Header | ............... | E04F 11/1853 |
| 9,945,511 B2 * | 4/2018 | Mitrovic | ............... | E04B 2/7401 |
| 10,030,680 B2 * | 7/2018 | Allen | ............... | E04C 1/42 |
| 2010/0225040 A1* | 9/2010 | Allen | ............... | E04F 11/1851 269/297 |

(Continued)

*Primary Examiner* — Phi D A
(74) *Attorney, Agent, or Firm* — Donald J. Ersler

(57) ABSTRACT

A glass panel shoe preferably includes a frame rail, a pair of pressure grip plates, a pair of strip gaskets, a plurality of retention set screws, a plurality of wedge retention devices and a plurality of leveling set screws. The frame rail includes a panel slot. Two rows of threaded holes are formed in at least one wall to threadably receive the plurality of retention set screws. A glass panel rail frame preferably includes a frame rail, a pressure grip plate, a pair of strip gaskets and a plurality of retention set screws. The frame rail includes a panel slot, a web slot and a retention strip. The panel slot is formed in the top of the frame rail to receive a glass panel and the web slot is formed in a bottom thereof. A plurality of retention set screws are threadably retained in one wall of the frame rail.

12 Claims, 6 Drawing Sheets

(56) References Cited

U.S. PATENT DOCUMENTS

| | | | |
|---|---|---|---|
| 2014/0086680 A1* | 3/2014 | Header | E04D 13/10 403/374.3 |
| 2014/0334874 A1* | 11/2014 | Allen | E04C 1/42 403/374.3 |
| 2015/0110552 A1* | 4/2015 | Yang | F16B 2/14 403/374.1 |
| 2015/0240851 A1* | 8/2015 | Giacometti | F16B 9/023 403/374.3 |
| 2017/0101784 A1* | 4/2017 | Gonzato | E04F 11/1812 |

\* cited by examiner

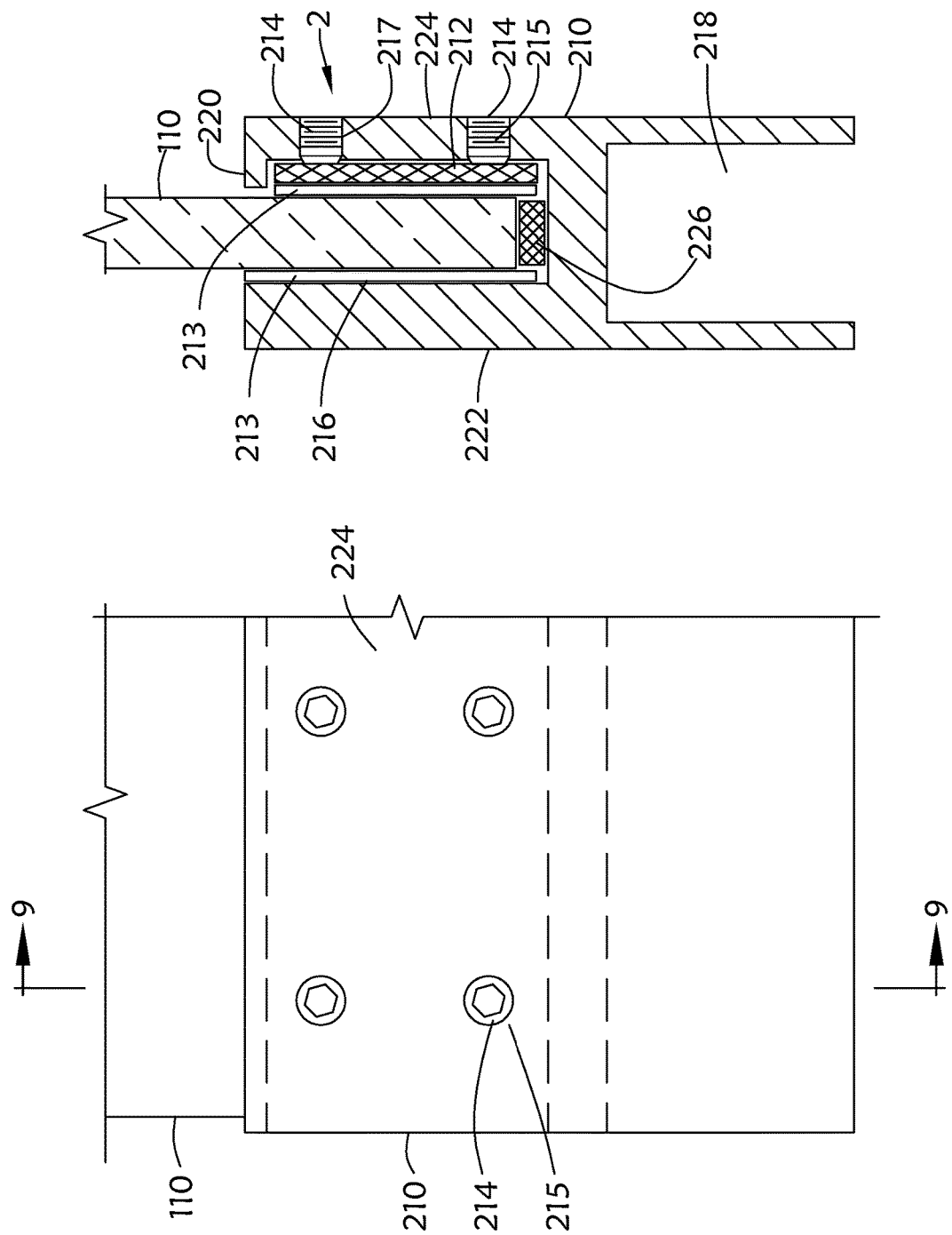

GLASS PANEL SHOE AND GLASS PANEL RAIL FRAME

BACKGROUND OF THE INVENTION

1. Field of the Invention

The present inventions relate generally to retaining glass panels and more specifically to a glass panel shoe, which allows adjustability of a glass panel retained in the shoe for a building, and a glass panel rail frame, which retains a glass panel in a rail frame for a wall or door assembly.

2. Discussion of the Prior Art

U.S. Pat. No. 4,054,268 to Sher discloses a glass panel railing. U.S. Pat. No. 7,559,536 to Hansen et al. discloses a structural glass railing base shoe design. However, neither Sher or Hansen et al. disclose the same adjustment features of the glass panel shoe of the present invention. U.S. Pat. No. 4,680,903 to Horgan, Jr. discloses a door shoe assembly. U.S. Pat. No. 4,914,888 to Hanson discloses a support frame for glass panel. U.S. Pat. No. 5,069,010 to Trainor, Jr. et al. discloses a glass door or partition support rail. U.S. Pat. No. 6,434,905 to Sprague discloses a door rail system. However, none of the prior art references disclose the double level set screws of the glass panel rail of the present invention.

Accordingly, there is a clearly felt need in the art for a glass panel shoe, which allows adjustability of a glass panel retained in the shoe for a building, and a glass panel rail frame, which retains a glass panel in a rail frame for a wall or door assembly.

SUMMARY OF THE INVENTION

The present invention provides a glass panel shoe, which allows adjustability of a glass panel retained in a shoe for a building. The glass panel shoe preferably includes a frame rail, a pair of pressure grip plates, a pair of strip gaskets, a plurality of retention set screws, a plurality of wedge retention devices and a plurality of leveling set screws. The frame rail preferably includes a panel slot and a pair of retention strips. The panel slot is formed in the frame rail to receive a glass panel. The pair of retention strips extend inward from opposing side walls of at a top of the panel slot. A plurality of retention counter bores are formed in a bottom of the frame rail to receive fasteners for attaching the frame rail to a support surface. A lower row of set screws are formed at a first height and an upper row of set screws are formed at a second height in at least one wall of the frame rail to receive the plurality of retention set screws.

Each wedge retention device preferably includes a pushing set screw, a wedge pusher member, a wedge pressure member and a cover plug. A plurality of lower adjustment holes and a plurality of upper adjustment holes are preferably formed in one wall of the frame rail to receive the wedge pusher. A threaded tap is formed in an entrance to each adjustment hole to receive the pushing set screw. A plurality of lower pressure holes are formed through the wall to communicate with a bottom of the plurality of lower adjustment holes. The lower pressure hole is sized to receive wedge pressure member and the cover plug. A plurality of upper pressure holes are formed through the wall to communicate with a bottom of the plurality of upper adjustment holes. The upper pressure hole is sized to receive wedge pressure member and the cover plug.

A plurality of vertical threaded taps are formed in both walls to threadably receive a plurality of leveling set screws. A plurality of leveling threaded counterbores are formed through a bottom of the panel slot to receive a plurality of panel leveling screws. If the plurality of panel leveling screws are not used, a setting block is placed on a bottom of the panel slot. In use, the frame rail is attached to a support surface with a plurality of fasteners. A plurality of leveling screws are threaded into plurality of threaded counter bores, or the setting block is placed on a bottom of the panel slot. The strip gasket is attached to a side surface of the pressure grip plate. The pair of strip gaskets and pressure grip plates are inserted into opposing sides of the panel slot. The glass panel is dropped into the frame rail. The glass panel is captured and positioned by tightening the plurality of set screws. The frame rail may be leveled with the plurality of leveling set screws.

The present invention also provides a glass panel rail frame, which retains a glass panel in a rail frame for a wall or door assembly. The glass panel rail frame preferably includes a frame rail, a pressure grip plate, a pair of strip gaskets and a plurality of retention set screws. The frame rail includes a panel slot, a web slot and a retention strip. The panel slot is formed in the top of the frame rail to receive a glass panel. The web slot is formed in a bottom of the frame rail. The retention strip extends inward from one of the side walls of the panel slot at top thereof to retain the pressure grip plate. A lower row of set screws are formed at a first height and an upper row of set screws are formed at a second height in one wall of the frame rail to receive the plurality of retention set screws. A setting block is preferably placed on a bottom of the panel slot. In use, one of the pair of strip gaskets is attached to a side surface of the pressure grip plate and the other one is attached to an opposing side wall of the panel slot. The strip gasket and pressure grip plate are inserted into the panel slot. The glass panel is dropped into the frame rail. The glass panel is captured and positioned by tightening the plurality of retention set screws.

Accordingly, it is an object of the present invention to provide a glass panel shoe, which allows adjustability of a glass panel retained in a shoe for a building.

Finally, it is another object of the present invention to provide a glass panel rail frame, which retains a glass panel retained in a rail frame for a wall or door assembly.

These and additional objects, advantages, features and benefits of the present invention will become apparent from the following specification.

BRIEF DESCRIPTION OF THE DRAWINGS

FIG. 8 is a front view of a glass panel rail frame in accordance with the present invention.

FIG. 9 is a cross sectional view of a glass panel rail frame rail, cut through FIG. 8 in accordance with the present invention.

DETAILED DESCRIPTION OF THE PREFERRED EMBODIMENTS

Figure 1:
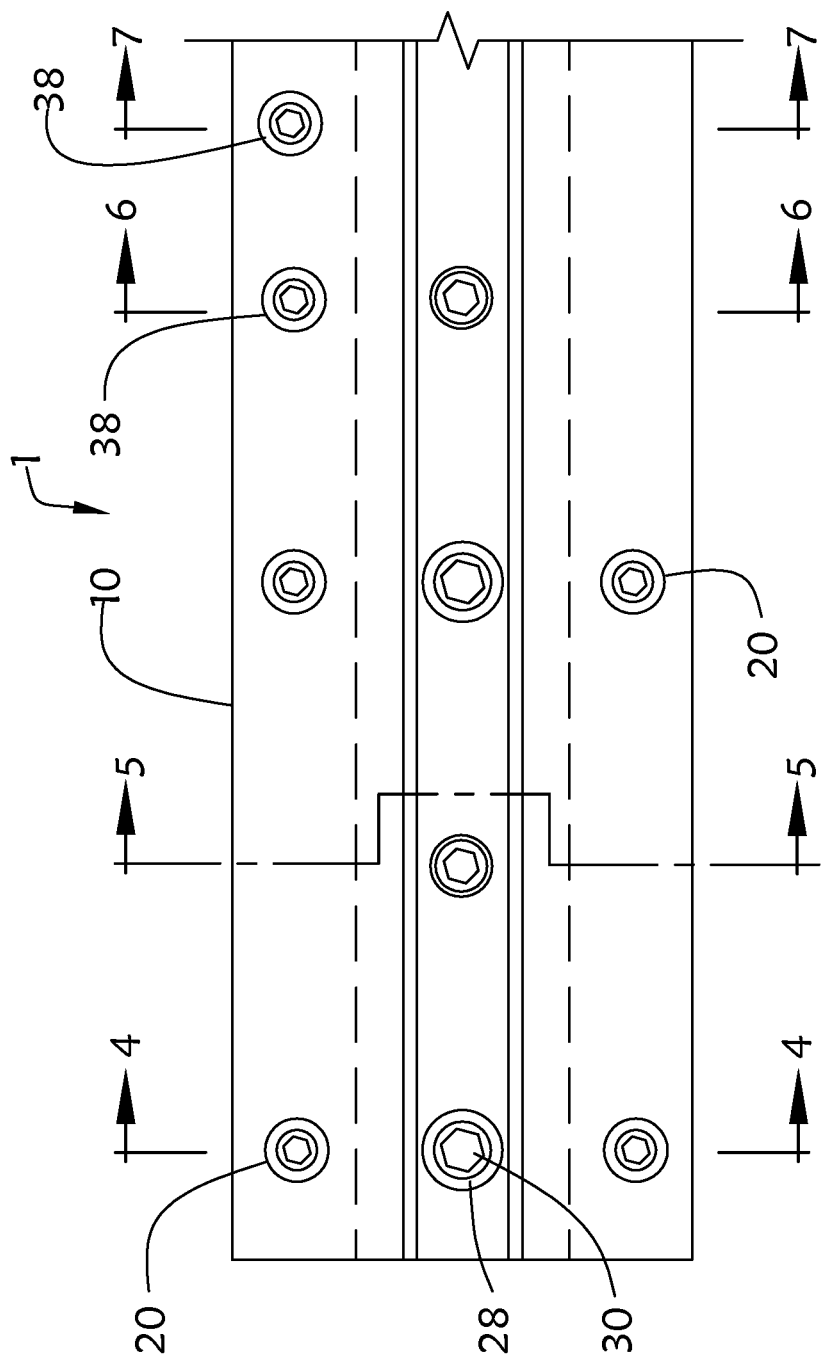
FIG. 1 is a top view of a glass panel shoe in accordance with the present invention.
Figure 2:
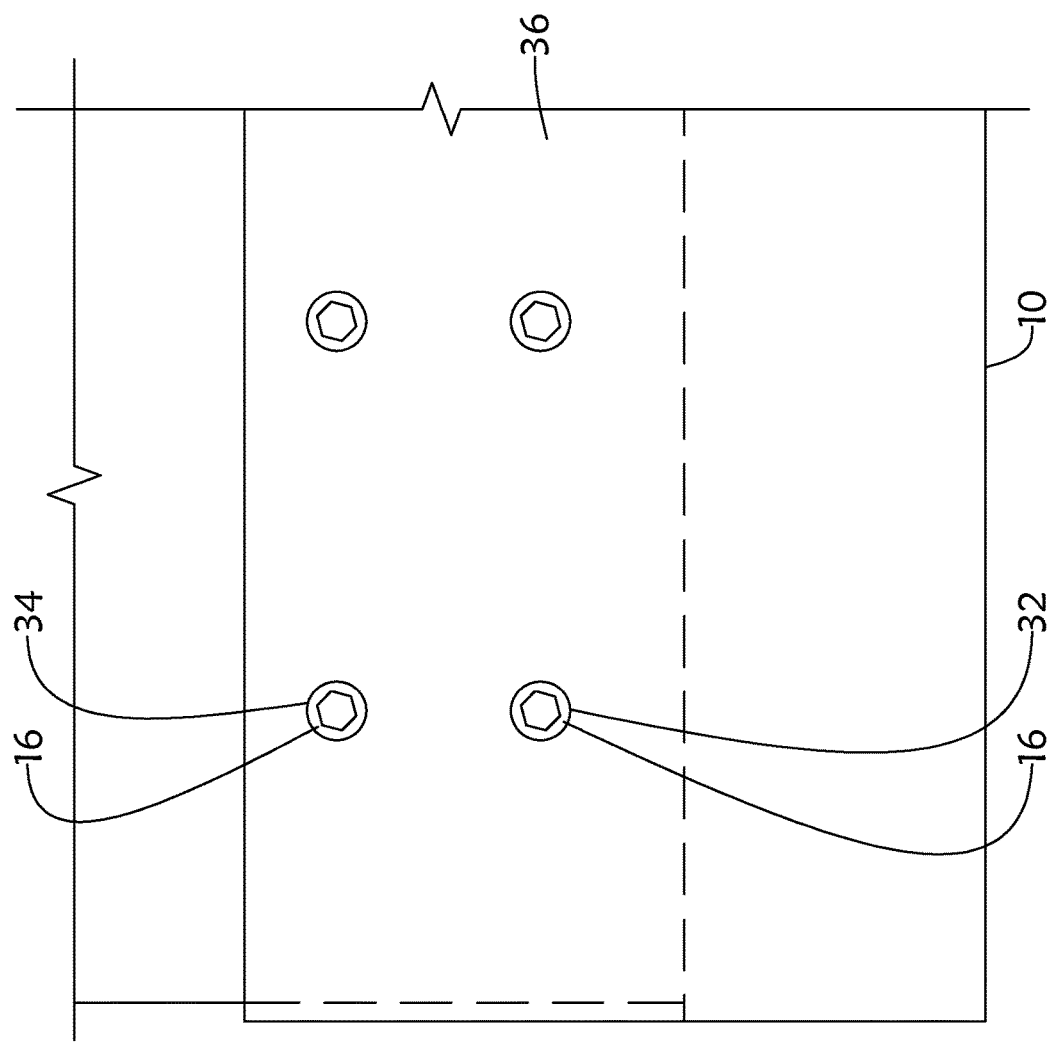
FIG. 2 is a front view of a glass panel shoe in accordance with the present invention.
Figure 3:
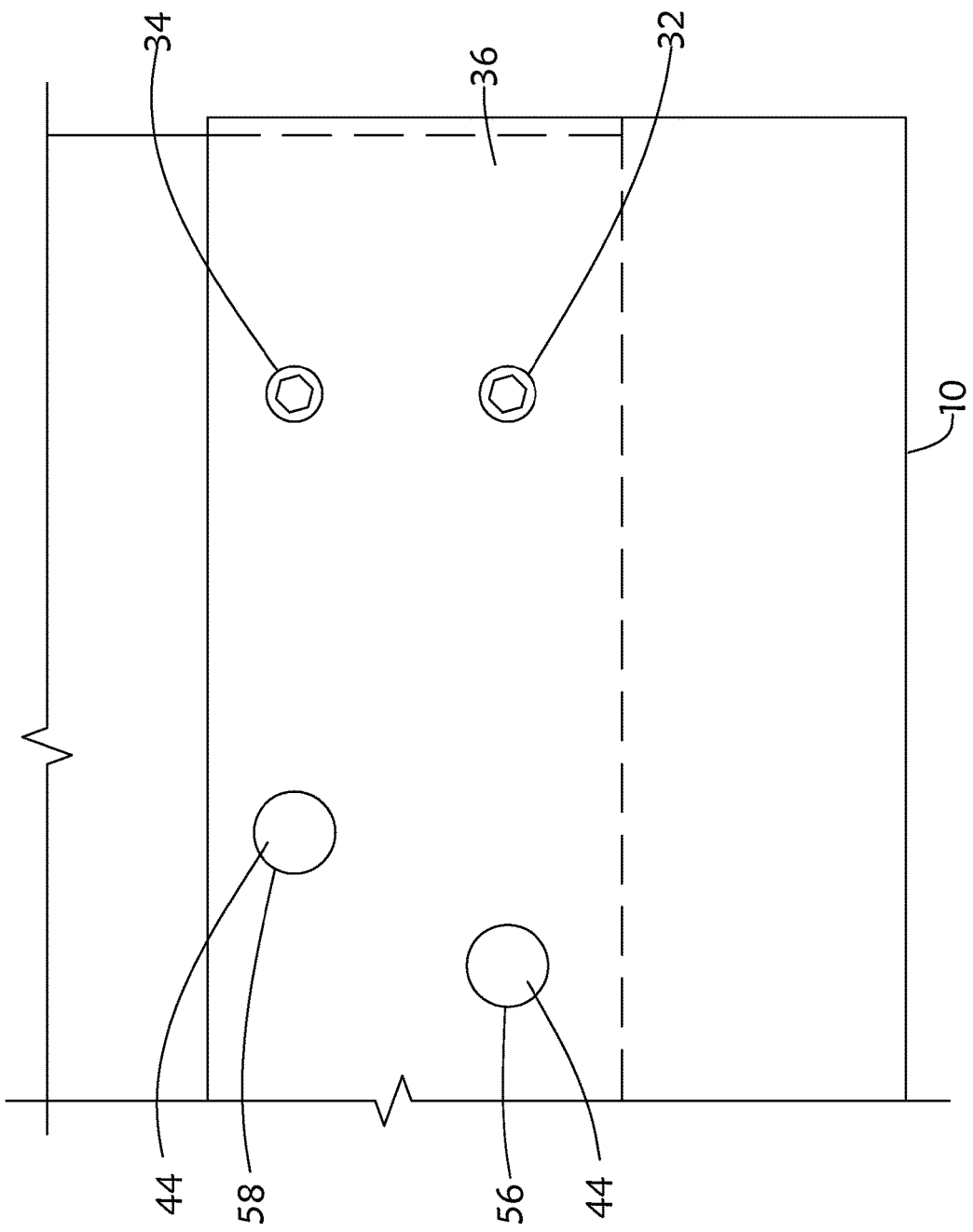
FIG. 3 is a rear view of a glass panel shoe in accordance with the present invention.
Figure 5:
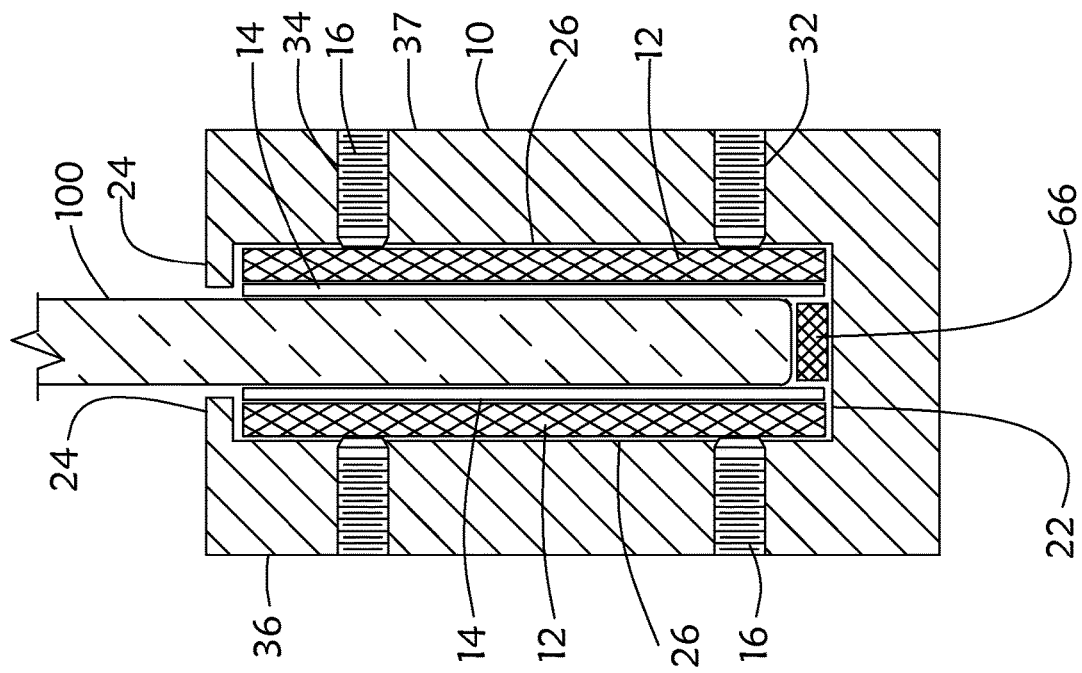
FIG. 5 is a cross sectional view of a glass panel shoe, cut through FIG. 1 in accordance with the present invention.
Figure 4:
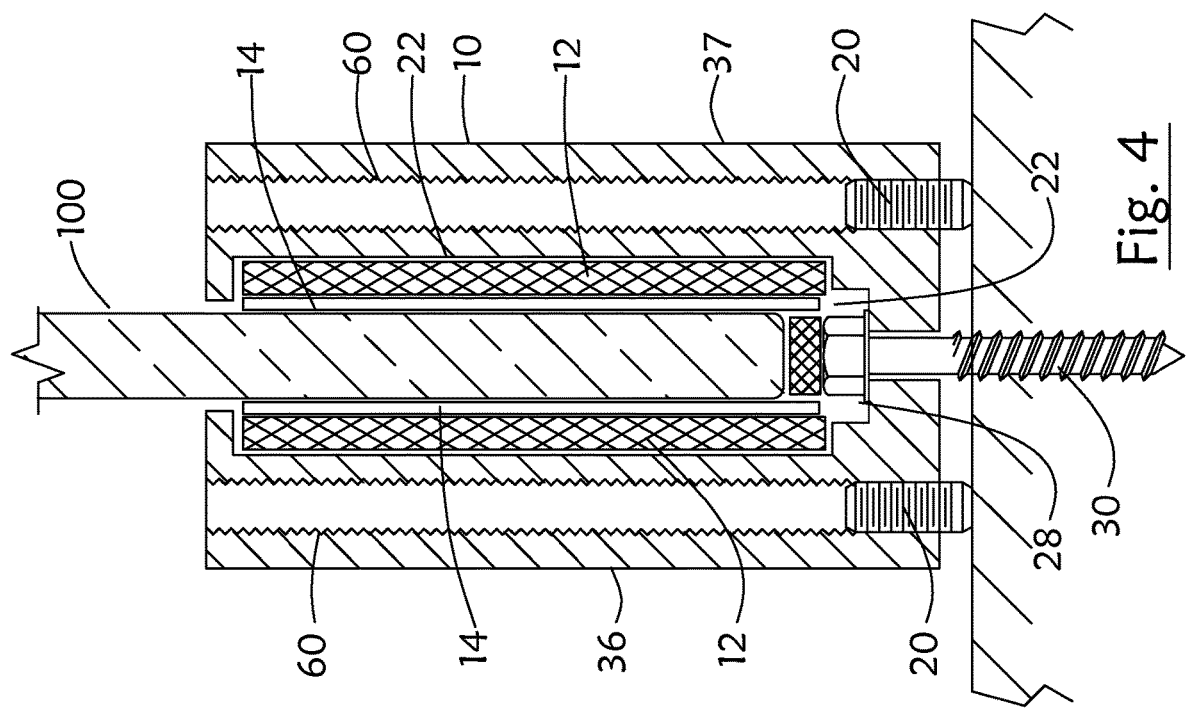
FIG. 4 is a cross sectional view of a glass panel shoe, cut through FIG. 1 in accordance with the present invention.

With reference now to the drawings, and particularly to FIG. 1, there is shown a top view of a glass panel shoe 1. With reference to FIGS. 2-7, the glass panel shoe 1 preferably includes a frame rail 10, a pair of pressure grip plates 12, a pair of strip gaskets 14, a plurality of retention set screws 16, a plurality of wedge retention devices 18, 19 and a plurality of leveling set screws 20. With reference to FIG. 5, the frame rail 10 includes a panel slot 22 and a pair of opposed retention strips 24. The panel slot 22 is formed in the frame rail 10 to receive a glass panel 100, and to create a first wall 36 and a second wall 37. The pair of retention strips 24 extend inward from opposing side walls 26 at a top of the panel slot 22. With reference to FIG. 4, a plurality of retention counter bores 28 are formed in a bottom of the panel slot 22 to receive fasteners 30 for attaching the frame rail 10 to a support surface 102. With reference to FIG. 2, a lower row of retention threaded holes 32 are formed at a first height and an upper row of retention threaded holes 34 are formed at a second height in at least one wall 26 of the frame rail 10 to receive the plurality of retention set screws 16.

Figure 7:
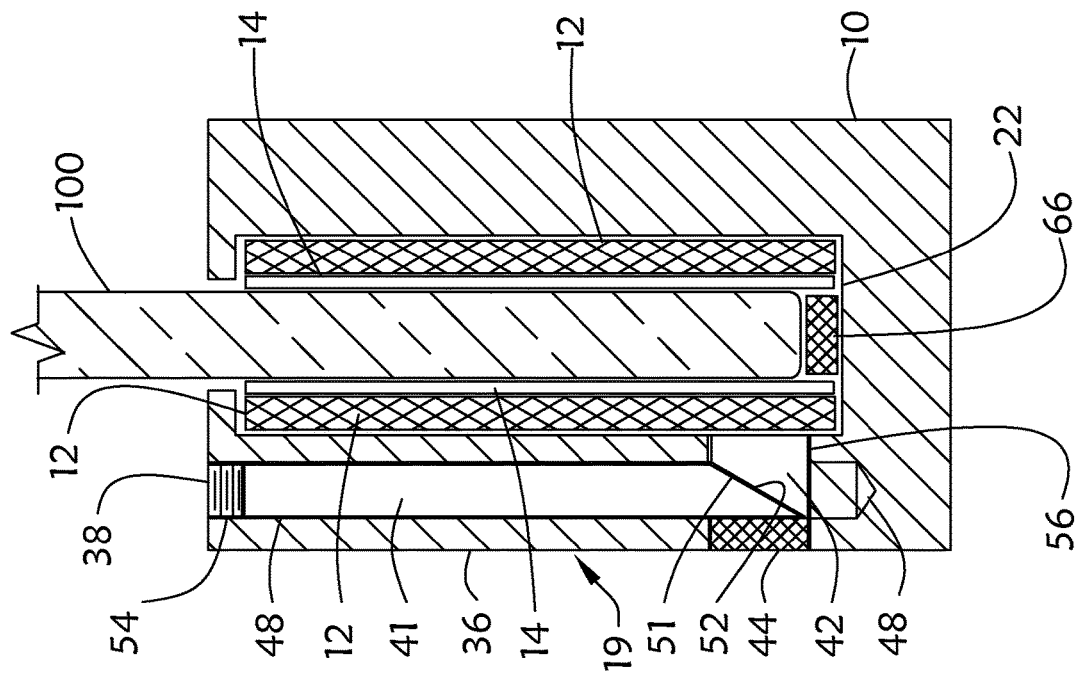
FIG. 7 is a cross sectional view of a glass panel shoe, cut through FIG. 1 in accordance with the present invention.
Figure 6:
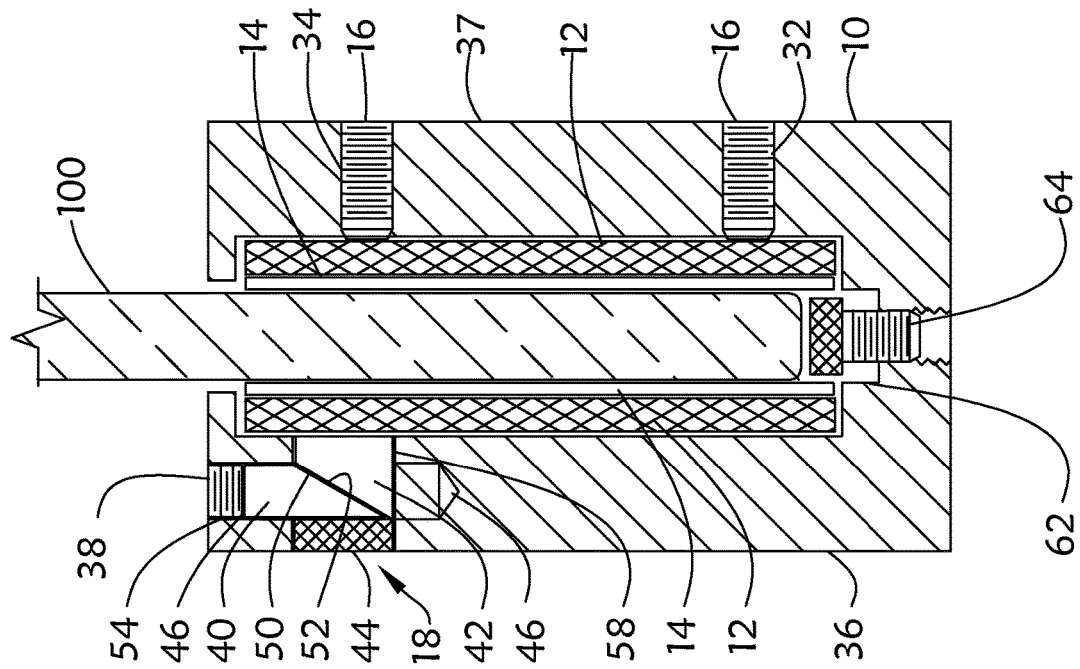
FIG. 6 is a cross sectional view of a glass panel shoe, cut through FIG. 1 in accordance with the present invention.

With reference to FIGS. 6-7, each wedge retention device 18, 19 preferably includes a pushing set screw 38, a wedge pusher member 40, 41, a wedge pressure member 42 and a cover plug 44. A plurality of upper adjustment holes 46 and a plurality of lower adjustment holes 48 are preferably formed in the first wall 36 of the frame rail 10 to receive the wedge pusher member 40, 41. The wedge pusher 40, 41 include a tapered member surface 50, 51. The wedge pressure member 42 includes a pressure tapered surface 52. A threaded tap 54 is formed in an entrance to each adjustment hole 46, 48 to threadably receive the pushing set screw 38. A plurality of lower pressure holes 56 are formed through the wall to communicate with the upper adjustment hole 46. The lower pressure hole 56 is sized to receive the wedge pressure member 42 and the cover plug 44. A plurality of upper pressure holes 58 are formed through the first wall 36 to communicate with the lower adjustment hole 48. The upper pressure hole 58 is sized to receive the wedge pressure member 42 and the cover plug 44. With reference to FIG. 4, a plurality of vertical threaded holes 60 are formed in the first and second walls 36, 37 to threadably receive the plurality of leveling set screws 20. With reference to FIG. 6, a plurality of leveling threaded counterbores 62 are formed through a bottom of the panel slot 22 to receive a plurality of leveling screws 64. With reference to FIG. 5, if the plurality of leveling screws 64 are not used, a setting block 66 is placed on a bottom of the panel slot 22. In use, the frame rail 10 is attached to a support surface 102 in FIG. 4 with a plurality of fasteners 30. The plurality of leveling screws 64 are threaded into plurality of threaded counter bores 62, or the setting block 66 is placed on a bottom of the panel slot 22. The strip gasket 14 is attached to a side surface of the pressure grip plate 12. The pair of strip gaskets 14 and pressure grip plates 12 are inserted into opposing sides of the panel slot 22. The glass panel 100 is dropped into the panel slot 22. The glass panel 100 is captured and positioned by tightening the plurality of set screws 16 and 38. The frame rail 10 may be leveled with the plurality of leveling set screws 20.

With reference now to FIG. 9, there is shown a cross sectional view of a glass panel 110 retained in a glass panel rail frame 2. With reference to FIG. 8, the glass panel rail frame 2 preferably includes a frame rail 210, a pressure grip plate 212, a pair of strip gaskets 213 and a plurality of retention set screws 214. The frame rail 210 includes a panel slot 216, a web slot 218 and a retention strip 220. The panel slot 216 is formed in a top of the frame rail 210 to receive a glass panel 110 and forms a first wall 222 and a second wall 224. The web slot 218 is formed in a bottom of the frame rail 210. The retention strip 220 extends inward from the second wall 224 of the frame rail 210 at a top thereof to retain the pressure grip plate 212. A lower row of threaded retention holes 215 are formed at a first height and an upper row of threaded retention holes 217 are formed at a second height in the second wall 224 to receive the plurality of retention set screws 214. A setting block 226 is preferably placed on a bottom of the panel slot 216. In use, one of the pair of strip gaskets 213 is attached to a side surface of the pressure grip plate 212 and the other gasket 213 is attached to an opposing side wall of the panel slot 216. The strip gasket 213 and pressure grip plates 216 are inserted into the panel slot 216. The glass panel 110 is dropped into the frame rail 210. The glass panel 110 is captured by tightening the plurality of retention set screws 214.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A glass panel shoe comprising:
a frame rail having a panel slot, a first wall on a first side of said panel slot and a second wall on a second side of said panel slot;
a pair of pressure grip plates being disposed on opposing sides of said panel slot;
at least one row of threaded fasteners are threadably retained in one of said first and second walls; and
a plurality of top and bottom horizontal pressure holes are formed through the other one of said first and second walls to receive a plurality of wedge pressure members, each one of said plurality of wedge pressure members includes a pressure tapered surface, a plurality of vertical holes are formed to communicate with said plurality of horizontal pressure holes, said plurality of vertical holes are sized to receive a plurality of wedge pusher members, each one of said plurality of wedge pusher members includes a pusher tapered surface, a plurality of threaded fasteners are threaded into said plurality of vertical holes to force said pusher tapered surface against said pressure tapered surface to force said plurality of wedge pressure members inward against one of said pair of pressure gripper plates in a horizontal axis, wherein said plurality of top and bottom wedge pressure members are adjusted from a top surface of said frame rail.

2. The glass panel shoe of claim 1, further comprising:
a plurality of vertical threaded taps are formed in said first and second walls to threadably receive a plurality of leveling screws.

3. The glass panel shoe of claim 1, further comprising:
a plurality of leveling threaded counter bores are formed through a bottom of said slot to receive a plurality of leveling screws.

4. The glass panel shoe of claim 1, further comprising:
at least one setting block is placed on a bottom of said panel slot to cushion a bottom of a glass panel.

5. The glass panel shoe of claim 1, further comprising:
a plurality of retention counter bores are formed in a bottom of said panel slot to receive a plurality of mounting fasteners.

6. The glass panel shoe of claim 1, further comprising:
a vinyl strip is attached to an inner surface of each said pair of pressure grip plates.

7. A glass panel shoe comprising:
a frame rail having a panel slot, a first wall on a first side of said panel slot and a second wall on a second side of said panel slot;
a pair of pressure grip plates being disposed on opposing sides of said panel slot; and
a plurality of top and bottom horizontal pressure holes are formed through said first and second walls to receive a plurality of wedge pressure members, each one of said plurality of wedge pressure members includes a pressure tapered surface, a plurality of vertical holes are formed to communicate with said plurality of top and bottom horizontal pressure holes, said plurality of vertical holes are sized to receive a plurality of wedge pusher members, each one of said plurality of wedge pusher members includes a pusher tapered surface, a plurality of threaded fasteners are threaded into said plurality of vertical holes to force said pusher tapered surface against said pressure tapered surface to force said plurality of wedge pressure members inward against said pair of pressure gripper plates in a horizontal axis, wherein said plurality of top and bottom wedge pusher members are adjusted from a top surface of said frame rail.

8. The glass panel shoe of claim 7, further comprising:
a plurality of vertical threaded taps are formed in said first and second walls to threadably receive a plurality of leveling set screws.

9. The glass panel shoe of claim 7, further comprising:
a plurality of leveling threaded counter bores are formed through a bottom of said slot to receive a plurality of leveling screws.

10. The glass panel shoe of claim 7, further comprising:
at least one setting block is placed on a bottom of said panel slot to cushion a bottom of a glass panel.

11. The glass panel shoe of claim 7, further comprising:
a plurality of retention counter bores are formed in a bottom of said panel slot to receive a plurality of mounting fasteners.

12. The glass panel shoe of claim 7, further comprising:
a vinyl strip is attached to an inner surface of each said pair of pressure grip plates.

\* \* \* \* \*